United States Patent [19]

Foley et al.

[11] Patent Number: 4,985,844
[45] Date of Patent: Jan. 15, 1991

[54] STATISTICAL WAVEFORM PROFILER EMPLOYING COUNTER/TIMER

[75] Inventors: Clark P. Foley, Portland, Oreg.; Donald L. Taylor, Vancouver, Wash.

[73] Assignee: Tektronix, Inc., Beaverton, Oreg.

[21] Appl. No.: 348,434

[22] Filed: May 8, 1989

[51] Int. Cl.$^5$ .............................................. G06F 15/20
[52] U.S. Cl. .................................. 364/487; 364/554; 324/77 A
[58] Field of Search ...................... 364/554, 487, 569; 324/77 A; 377/111; 368/121; 382/51

[56]  References Cited

U.S. PATENT DOCUMENTS

| | | | |
|---|---|---|---|
| 3,348,031 | 10/1967 | Russell, Jr. et al. | |
| 4,129,827 | 12/1978 | Southwick | 324/77 A |
| 4,152,642 | 5/1979 | Doherty | 324/77 A |
| 4,204,260 | 5/1980 | Nysen | 364/554 |
| 4,523,289 | 6/1985 | Soma et al. | 364/569 |
| 4,625,283 | 11/1986 | Hurley | 364/487 |
| 4,670,711 | 6/1987 | Daniels | 324/77 A |
| 4,876,655 | 10/1989 | Carlton et al. | 364/487 |

Primary Examiner—Parshotam S. Lall
Assistant Examiner—S. A. Melnick
Attorney, Agent, or Firm—Boulden G. Griffith; Francis I. Gray

[57]  ABSTRACT

A method for producing a statistical profile of a repetitive electrical signal entails selecting a window pulse width that is preferably a large multiple of the period of the signal, setting a comparison threshold, and counting the time that the signal is above (or below) the comparison threshold during the window pulse. The comparison threshold is then repeatedly incremented (or decremented) over the amplitude range of the signal, while this procedure is repeated at each level. The difference is then taken between the times measured at adjacent amplitude increments and the absolute value of these differences is displayed as the waveform profile. An apparatus for implementing this method includes a counter/timer, a gate, a comparator, a pulse generation circuit, a comparison threshold generation circuit, and a microprocessor for controlling the other circuit elements and performing calculations. The incoming repetitive signal is coupled to one input of the comparator and the output of the comparison threshold generation circuit is coupled to the other input. The output of the comparator is applied to the gate input along with the output of the pulse generation circuit. The output of the gate enables the counter/timer. The microprocessor controls the comparison threshold generation circuit and the pulse generation circuit, reads back the output of the counter/timer, and calculates the absolute value of the differences between times counted at adjacent amplitude thresholds.

13 Claims, 3 Drawing Sheets

STATISTICAL WAVEFORM PROFILER EMPLOYING COUNTER/TIMER

BACKGROUND OF THE INVENTION

This invention relates to the field of waveform analysis, and more particularly to the field of analyzing the relative amount of time that a repetitive electrical signal spends at each of the voltage levels that it assumes.

Histogram displays representing the waveform profile or relative amount of time that a repetitive electrical signal spends at each of the voltage levels that it passes through have been used in the analysis of waveforms for some time Once this waveform profile data is available, numerous calculations of other waveform parameters can be made directly from this data, without further need for the actual waveform data itself. The minimum, maximum, mean, median, peak-to-peak, topline, baseline, and the root-mean-square values can all be calculated from the waveform profile (or histogram) data. And, once the topline and baseline are known, overshoot and other aberrations can also be quantified.

The mostly commonly used method for generating waveform profile data, or a histogram, has been based on sampling the signal a number of times, then sorting those samples into amplitude bins and counting the number of samples that fall into each bin. The actual sampling is typically performed by a high speed A/D (analog-to-digital) converter. There are, however, limits to how fast sequential, real-time sampling can be performed. There is also a limitation to how accurately one can know when the sample was taken, i.e., timing resolution.

If equivalent time sampling is used instead of real-time sampling, higher frequency signals can be analyzed, but the time required to complete the acquisition of the necessary data is considerably increased.

The quality of histograms created from sampled data is also limited by the number of points sampled and stored. To the extent that the record length is not long enough, the statistical basis for the histogram data is limited.

What is desired is an alternative approach to establishing a waveform profile, one that works effectively at the highest possible frequencies, that produces waveform profiles with a sound statistical basis in a minimum amount of time, and that is suitable for a counting/timing oscilloscope or other instrument without high-speed digitizing capabilities.

SUMMARY OF THE INVENTION

The present invention is a method and apparatus for producing a statistical profile of a repetitive electrical signal that relies on a counter/timer instead of an A/D converter. A comparison threshold is incremented throughout the amplitude range of the signal being profiled. At each threshold level, during the duration of a window pulse that is a large multiple of the period of the signal, a counter/timer is turned on every time the signal rises above this threshold and turned off every time the signal drops below this threshold. Alternatively, the counter/timer can be turned on when the signal drops below the threshold and turned off when the signal rises above it. Using either approach, the difference is then taken between the times measured at adjacent amplitude increments and the absolute value of these differences is displayed as the waveform profile.

The circuit that implements this method includes a counter/timer, a gate, a comparator, a pulse generation circuit, a comparison threshold generation circuit, and a microprocessor for controlling the other circuit elements and performing calculations. The incoming repetitive signal is coupled to one input of the comparator and the output of the comparison threshold generation circuit is coupled to the other input. The output of the comparator is applied to the gate input along with the output of the pulse generation circuit. The output of the gate enables the counter/timer. The microprocessor controls the comparison threshold generation circuit and the pulse generation circuit, and reads back the output of the counter/timer.

In operation, the microprocessor causes the pulse generation circuit to repeatedly enable one side of the gate over an interval that is some large multiple of the period of the incoming repetitive signal. The output of the gate is then active during those times that the gate is enabled and the comparator output is active, indicating those intervals during the window pulse that the amplitude of the repetitive signal is greater than the comparison threshold. During these times, the counter/timer is enabled and counts, and then has its final count read back by the microprocessor.

The microprocessor repeatedly changes the comparison threshold and activates the pulse generator again, enabling another series of counts during the intervals that the signal exceeds the new comparison threshold. Times counted for adjacent thresholds are subtracted from each other and the absolute value of the differences represent the time that the signal spent within each amplitude bin. The set of these times can then be graphed as a histogram or waveform profile. When counts and delta-times have been obtained for all amplitude values that the repetitive input signal assumes, the profile is complete.

DETAILED DESCRIPTION

Figure 1:
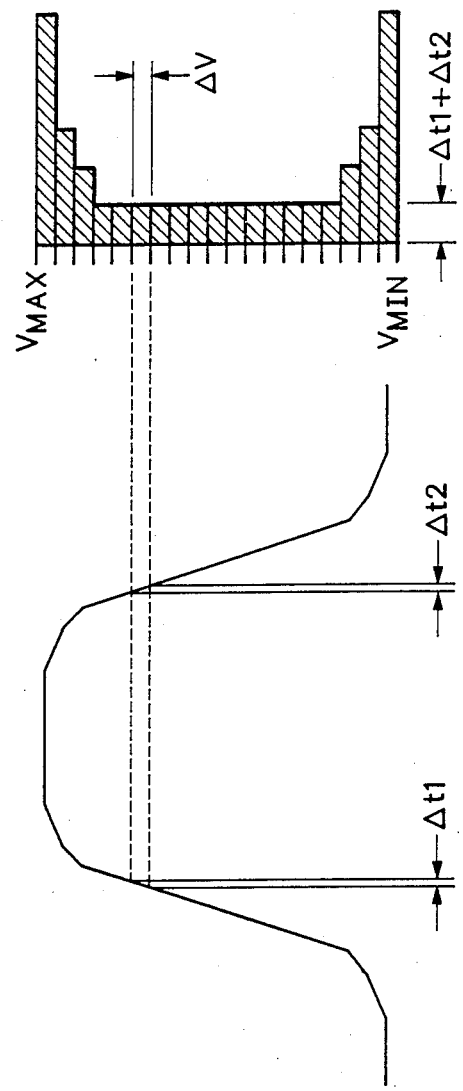
FIG. 1 is an illustration of the theory of the present invention.

FIG. 1 is an illustration of the theory of the method of the present invention. The time that the repetitive electronic signal is above each of a set of amplitude thresholds is measured and then the absolute value of the difference between each adjacent pair of these times is calculated. This approach to waveform profiling provides a way of measuring the delta-time associated with a corresponding delta-voltage on the repetitive waveform. When the data compiled by this method is graphed as a histogram, as shown at the right of FIG. 1, the result is the same as that reached by sampling the waveform with an analog-to-digital converter and sorting the results into the bins of the histogram.

Figure 2:
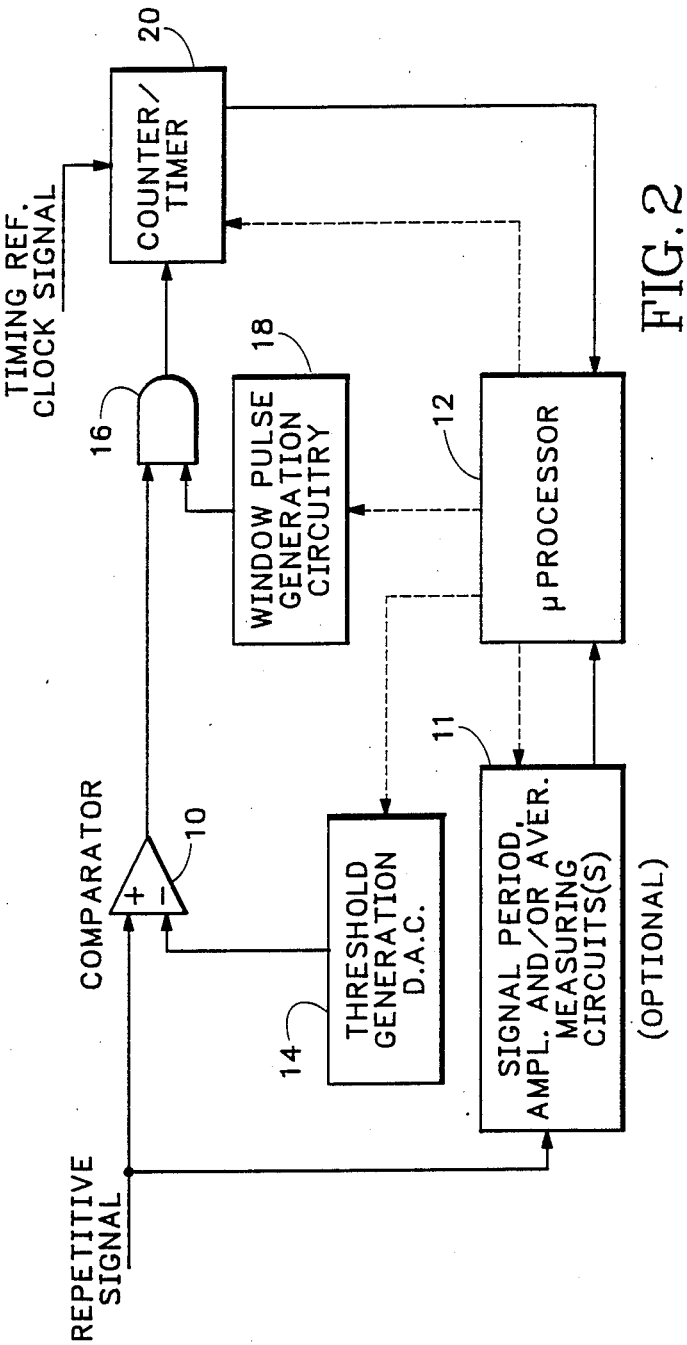
FIG. 2 is a block diagram of the apparatus of the present invention.

Referring to FIG. 2, a repetitive signal to be analyzed is applied to one side of a comparator 10 and to an (optional) siqnal period, amplitude, and/or average amplitude measuring circuit or circuits 11. A microprocessor 12 or other controlling and calculating means directs a threshold generation digital-to-analog converter (DAC) 14 to apply a comparison threshold to the other side of the comparator 10. This comparator 10 or other comparing means should have a hysteresis effect smaller than the threshold increment size. The output of the comparator 10 is applied to one input of an AND gate 6 or other gating means, such as a NOR gate. The other input of the AND gate 16 receives the output of window pulse generation circuitry 18, which is also under the control of the microprocessor 12. The output of the AND gate 16 enables a counter/timer 20 which counts on timing reference clock pulses. In an alternative configuration, not shown, the clock signal can be included as one of the inputs to the AND gate 16 and the output of the AND gate coupled to the clock input of the counter/timer 20 instead of the enable input. Either way, the output of the counter/timer 20 is coupled to be read back by the microprocessor 12.

In operation, the microprocessor 12 ascertains the period and amplitude of the incoming repetitive signal from some signal period, amplitude and/or average amplitude measuring circuit 11, or it can use additional algorithms and the other circuitry shown in FIG. 2 to determine these values. Alternatively, the microprocessor 12 can make assumptions about these parameters based on the settings of the rest of the instrument. This information about the incoming repetitive signal, whether based on measurements or assumptions, is used by the microprocessor 12 to calculate appropriate thresholds and pick window pulse durations, so that the comparison thresholds generated cover the range of the amplitude values assumed by the signal and the window pulse durations are a large multiple of the period of the repetitive signal.

During the period that the window pulse is active, one side of the AND gate 16 is enabled. Whenever the amplitude of the incoming repetitive pulse exceeds the comparison threshold, the comparator 10 produces an active output and the other side of the AND gate 16 is enabled producing an active output from the AND gate which then enables the counter/timer causing it to count clock signals. After the end of the window pulse, the microprocessor 12 reads out the count reached by the counter/timer 20.

The microprocessor 12 then changes the comparison threshold by sending different control values to the threshold generation DAC 14 and repeats the same process until comparison thresholds have been generated over the entire amplitude range of the signal. For each adjacent pair of comparison threshold values, the microprocessor 12 calculates the absolute value of the difference between the times counted by the counter/timer 20 for the two different threshold values.

Figure 3:
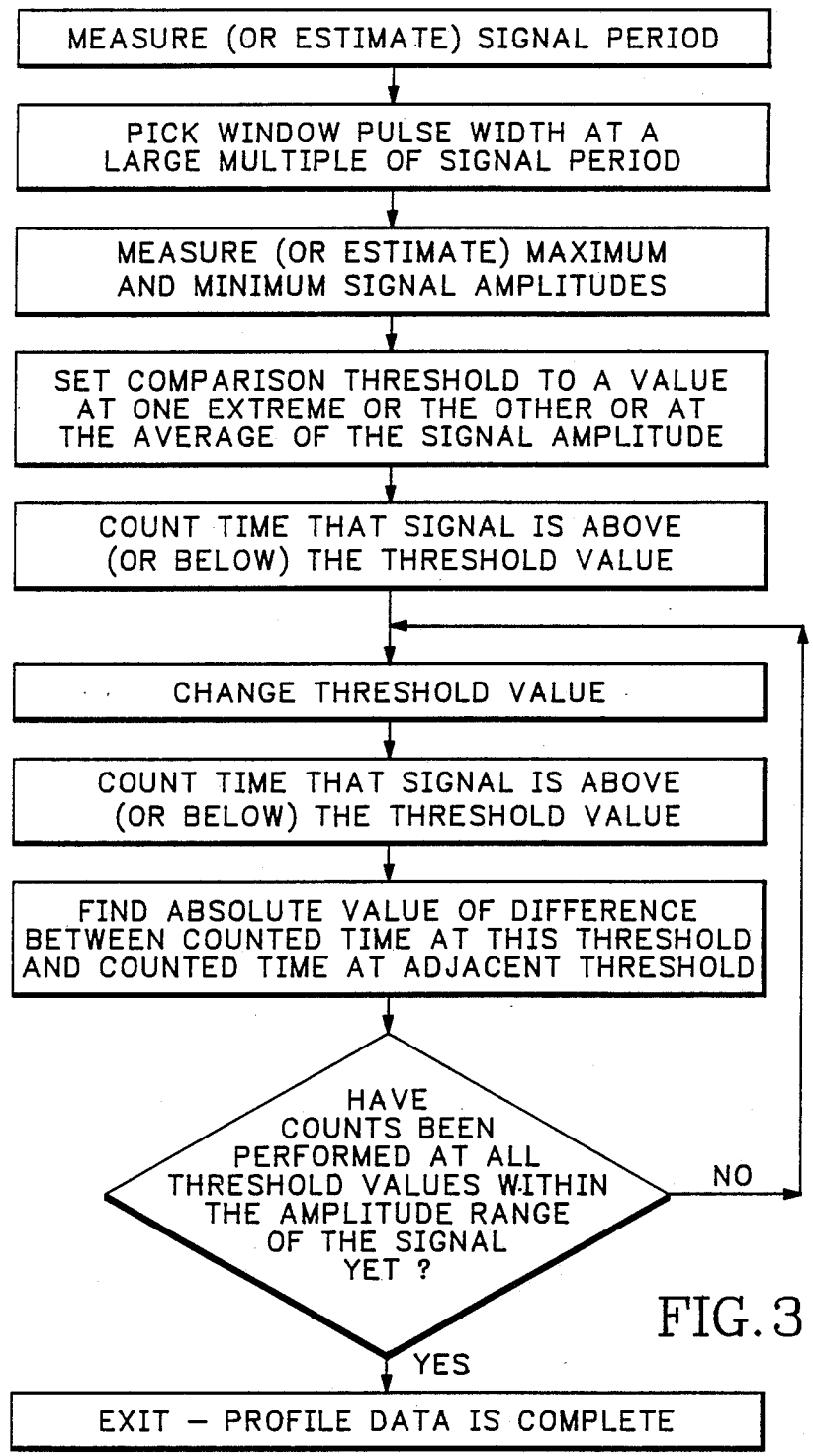
FIG. 3 is a flow chart of the method of the present invention.

FIG. 3 is a flow chart of the method of the present invention. The first step is either to measure or estimate the period of the incoming repetitive signal. It may not be necessary to actually measure the period of the incoming signal when adequate assumptions can be made instead. If there is plenty of time available within which to profile the waveform, it may be convenient to assume that the period of the signal is less than the time shown on the horizontal axis of an instrument display and use that time instead of the actual period as the basis for multiplication by a large number in the next step.

The second step shown in the flow chart of FIG. 3 is that of setting the window pulse generator to a large multiple of the measured or estimated period of the incoming repetitive signal. Measuring the period and multiplying it by a value of 100 has been found to produce very satisfactory results. The value of 100 is arbitrary, depending on how much accuracy is desired and how much time is available for performing the profiling operation.

The third step, of measuring or estimating the maximum and minimum signal amplitude, is similar to the step of measuring or estimating the signal period, in that an estimate may be adequate if the time available is sufficient to allow for performing more operations than are strictly required in order to make sure that the full amplitude of the signal is covered.

If the amplitude maximum and minimum have been measured, the output of the threshold generating means can be set to a voltage at or just beyond one extreme and varied (by the first step within the loop, the "change" step) until the other extreme is reached or barely exceeded. Alternatively, an average can be taken and the threshold generating means can initially be set to this value. Then it can be varied in one direction until no counts occur, indicating that the maximum excursion of the repetitive signal in that direction has been exceeded, and then returned to the middle of the signal again and varied in the other direction until the maximum excursion in that direction has been reached.

At each value of the comparison threshold, the counter/timer is used to count all of the time during the duration of the window pulse that the amplitude of the repetitive signal is above that threshold. Alternatively, the counter/timer could be activated to count during the time that the signal was below this threshold, rather than above it, and the same results would be obtained, since later steps only rely on the difference in these times, not their actual values.

The last step within the loop of FIG. 3 is finding the absolute value of the differences between each pair of comparison threshold values. Each pair of threshold comparison values can be thought of as the edges of an amplitude "bin", much like the amplitude bins into which digitized values are counted in the prior art method of developing a waveform profile histogram. By finding the difference between the times counted at each edge of these bins, the time spent within each of these bins is determined. As is shown in FIG. 1, these times correspond to a histogram or waveform profile of the repetitive signal.

Referring again to FIG. 3, the decision to exit the loop can take two forms. If the first comparison threshold was set at one amplitude extreme of the signal, the first time that a zero count, or a count corresponding to the full length of the window, occurs, the comparison threshold has reached the other amplitude extreme of the signal. If the first comparison threshold was set to the average value of the signal and incremented or decremented toward one amplitude extreme, the first time a zero count or full count occurs means that it is time to return to the starting point (average) and increment or decrement in the other direction. In this case, counts will have been completed for all of the possible threshold values when a zero count or full count is reached for the second time.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

We claim:

1. A method of obtaining a statistical waveform profile of the time during which a repetitive electronic signal is within each of a plurality of amplitude bins distributed over an amplitude range of the signal, each amplitude bin being bounded by an adjacent pair of threshold amplitudes, comprising the steps of:

generating a window pulse having a predetermined duration;

determining for the predetermined duration a time duration during which the amplitude of the repetitive electronic signal bears a predetermined relationship to each threshold amplitude for all the amplitude bins; and subtracting the time duration for each adjacent pair of threshold amplitudes to produce a plurality of time differences, one for each amplitude bin, the time differences representing times for the statistical waveform profile.

2. A method as recited in claim 1 wherein the determining step comprises the steps of:

enabling a counter whenever the amplitude of the repetitive electronic signal bears the predetermined relationship to the threshold amplitude; and counting the pulses of a clock signal when the counter is enabled, the counter being reset at the beginning of the window pulse and the number of pulses at the end of the window pulse representing the time duration.

3. A method as recited in claim 1 further comprising the step of displaying the absolute value of the plurality of time differences associated with each amplitude bin as the statistical waveform profile of the time that the repetitive electronic signal spent within each of the amplitude bins.

4. A method as recited in claim 1 wherein the generating step comprises the steps of:

determining a period of the repetitive electronic signal; and choosing the predetermined duration to be a large integer multiple of the period.

5. A method as recited in claim 1 further comprising the steps of:

finding an average amplitude value for the repetitive signal; and using the average amplitude value as an initial threshold amplitude for the determining step.

6. A method as recited in claim 1 wherein the determining step comprises:

comparing the repetitive electronic signal with the threshold amplitude to produce a comparison signal when the amplitude of the repetitive electronic signal exceeds the threshold amplitude; and counting the pulses of a clock signal during the window pulse when enabled by the comparison signal, the number of pulses counted during the window pulse being the time duration.

7. A method as recited in claim 1 wherein the determining step comprises:

comparing the repetitive electronic signal with the threshold amplitude to produce a comparison signal when the threshold amplitude exceeds the amplitude of the repetitive electronic signal; and counting the pulses of a clock signal during the window pulse when enabled by the comparison signal, the number of pulses counted during the window pulse being the time duration.

8. An apparatus for obtaining a statistical waveform profile of the time during which a repetitive electronic signal is within each of a plurality of amplitude bins distributed over an amplitude range of the signal, each amplitude bin being bounded by an adjacent pair of threshold amplitudes, comprising:

means for generating a window pulse having a predetermined duration;

means for determining during the duration of the window pulse a time duration during which the amplitude of the repetitive electronic signal bears a predetermined relationship to each threshold amplitude for all the amplitude bins; and means for subtracting the time durations for each adjacent pair of threshold amplitudes to produce a plurality of time differences, one for each amplitude bin, the time differences representing times for the statistical waveform profile.

9. An apparatus as recited in claim 8 wherein the determining means comprises:

means for counting the pulses of a clock signal; and means for enabling the counting means to count the pulses of the clock signal when the amplitude of the repetitive electronic signal bears the predetermined relationship to the threshold amplitude during the window pulse, the counting means being reset at the beginning of the window pulse and the number of pulses counted at the end of the window pulse representing the time duration.

10. An apparatus as recited in claim 8 further comprising:

means for measuring a period of the repetitive electronic signal; and means for setting the predetermined period to a large integer multiple of the period.

11. An apparatus as recited in claim 8 further comprising:

means for measuring the amplitude range of the repetitive electronic signal; and means for establishing the threshold amplitudes to define the amplitude bins as a function of the amplitude range.

12. An apparatus as recited in claim 8 wherein the generating means comprises a programmable pulse generator.

13. An apparatus as recited in claim 8 wherein the determining means comprises:

means for generating each threshold amplitude in sequence;

means for comparing the repetitive electronic signal with the threshold amplitude from the threshold amplitude generating means to produce a comparison signal representing the predetermined relationship;

means for combining the window pulse with the comparison signal to produce an enable signal; and means for counting the pulses of a clock signal when enabled by the enable signal, the counting means being reset at the beginning of the window pulse and the number of counts at the end of the window pulse being the time duration for the threshold amplitude.

* * * * *